United States Patent [19]
Howell et al.

[11] Patent Number: 5,689,699
[45] Date of Patent: Nov. 18, 1997

[54] DYNAMIC VERIFICATION OF AUTHORIZATION IN RETENTION MANAGEMENT SCHEMES FOR DATA PROCESSING SYSTEMS

[75] Inventors: William E. Howell, N. Richland Hills; Hari N. Reddy, Grapevine; Diana S. Wang, Trophy Club, all of Tex.

[73] Assignee: International Business Machines Corporation, Armonk, N.Y.

[21] Appl. No.: 996,421

[22] Filed: Dec. 23, 1992

[51] Int. Cl.[6] .................................................. G06F 17/30
[52] U.S. Cl. ............................................ 395/609; 380/4
[58] Field of Search ................................ 395/600, 425, 395/609, 761; 364/419.19; 380/3, 4

[56] References Cited

U.S. PATENT DOCUMENTS

| | | | |
|---|---|---|---|
| 4,899,299 | 2/1990 | MacPhail | 364/570 |
| 4,914,586 | 4/1990 | Swinehart et al. | 395/600 |
| 5,051,891 | 9/1991 | MacPhail | 395/600 |
| 5,107,419 | 4/1992 | MacPhail | 395/600 |
| 5,144,556 | 9/1992 | Wang et al. | 395/145 |
| 5,161,214 | 11/1992 | Addink | 395/145 |
| 5,297,278 | 3/1994 | Wang et al. | 395/600 |

OTHER PUBLICATIONS

Chenault et al., "Retention Management Program", Research Disclosure N267 07–86, Jul. 1986.

*Primary Examiner*—Paul V. Kulik
*Attorney, Agent, or Firm*—Geoffrey A. Mantooth

[57] ABSTRACT

In a retention management scheme, an object, such as a document or folder, is provided with an expiration time in the form of a time stamp attribute. The identification of the security subject providing the expiration time is also an attribute of the object. When the expiration time occurs, the authorization of the security subject is checked. If the security subject lacks authority to delete the expiration time, then the object is maintained on the data processing system and the expiration time is ignored. If the security subject has the authority to delete at the expiration time, then the object is deleted.

4 Claims, 9 Drawing Sheets

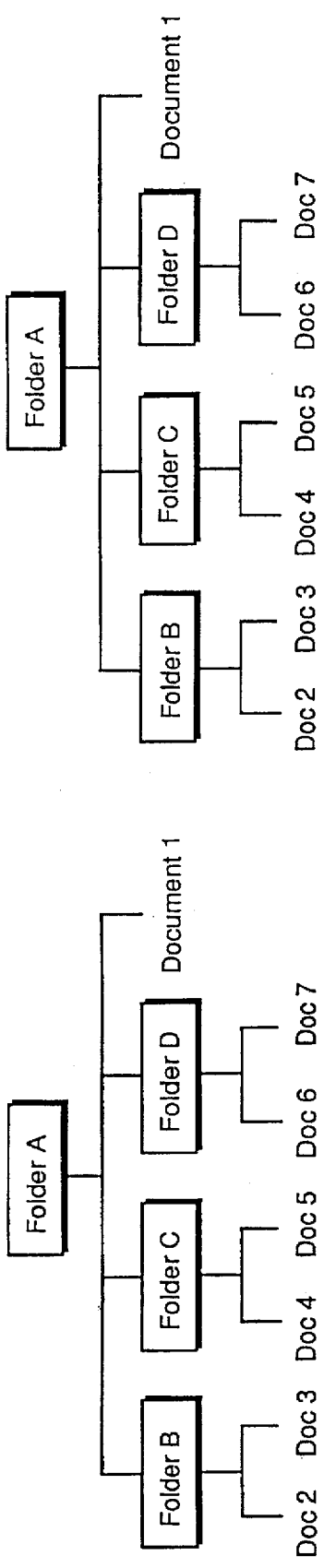

System time = 80
SS: X & Y

Folder A: Access X=delete
Retention attribute = <100,X>

Folder B: Document 2 and Document 3:
Access X=delete
Retention attribute = <110,X>

Folder C: Document 4 and Document 5:
Access X=delete
Retention attribute = <100,X>

Folder D: Document 6 and Document 7:
Access X=delete Y=modify
Lock status = <Locked, Y>

Document 1: Access X=delete
Retention attribute = <90, X>

Fig. 5

System time = 90
SS: X & Y
Action: Document 1 is deleted

Folder A: Access X=delete
Retention attribute = <100,X>

Folder B: Document 2 and Document 3:
Access X=delete
Retention attribute = <110,X>

Folder C: Document 4 and Document 5:
Access X=delete
Retention attribute = <100,X>

Folder D: Document 6 and Document 7:
Access X=delete Y=modify
Lock status = <Locked, Y>

Document 1: Access X=delete
Retention attribute = <90, X>

Fig. 6

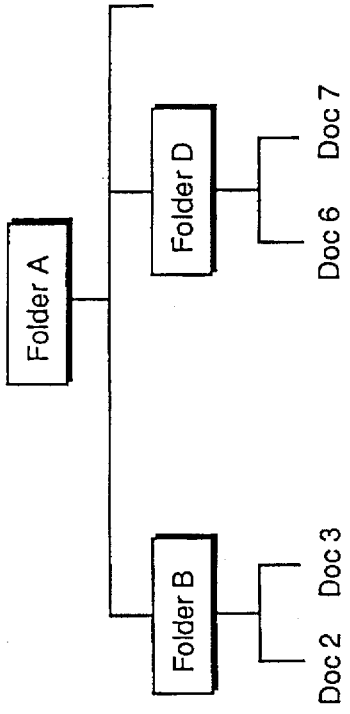

Fig. 8

System time = 105
SS: X & Y
Event: Unlock Folder D, Document 6 & 7
Action: Folder D, Document 6 & 7 are deleted Folder A: Access X=delete
Retention attribute = <100,X>

Folder B: Document 2 and Document 3:
Access X=delete
Retention attribute = <110,X>

Folder C: Document 4 and Document 5:
Access X=delete
Retention attribute = <100,X>

Folder D: Document 6 and Document 7:
Access X=delete Y=modify
Lock status = <Unlocked>

Document 1: Access X=delete
Retention attribute = <90, X>

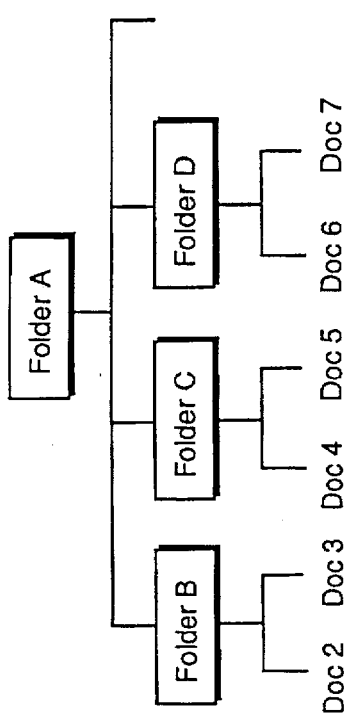

Fig. 7

System time = 100
SS: X & Y
Action: Folder C, Document 4 & 5 are deleted

Folder A: Access X=delete
Retention attribute = <100,X>

Folder B: Document 2 and Document 3:
Access X=delete
Retention attribute = <110,X>

Folder C: Document 4 and Document 5:
Access X=delete
Retention attribute = <100,X>

Folder D: Document 6 and Document 7:
Access X=delete Y=modify
Lock status = <Locked, Y>

Document 1: Access X=delete
Retention attribute = <90, X>

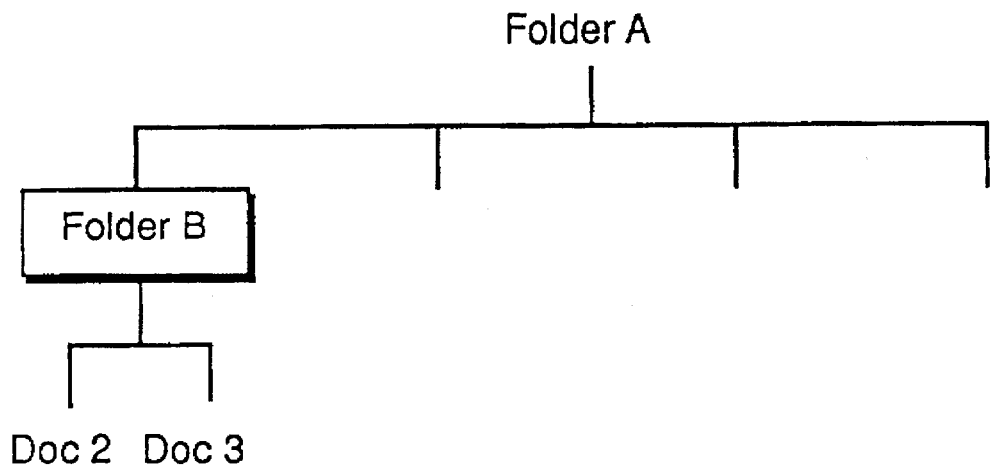

Fig. 9   System time = 110
         SS: X & Y
         Event: Folder B, Document 2 & 3 are
                eligible for deletion
         Action: Folder A, B, Document 2 & 3 are deleted Folder A:  Access X=delete
                    Retention attribute = <100,X>

Folder B:  Document 2 and Document 3:
                    Access X=delete
                    Retention attribute = <110,X>

Folder C:  Document 4 and Document 5:
                    Access X=delete
                    Retention attribute = <100,X>

Folder D:  Document 6 and Document 7:
                    Access X=delete Y=modify
                    Lock status = <Unlocked>

Document 1:  Access X=delete
                      Retention attribute = <90, X>

DYNAMIC VERIFICATION OF AUTHORIZATION IN RETENTION MANAGEMENT SCHEMES FOR DATA PROCESSING SYSTEMS

FIELD OF THE INVENTION

The present invention relates to retention management schemes in data processing systems, and in particular to the verification of authorization to delete objects from a data processing system.

BACKGROUND OF THE INVENTION

Data processing systems utilize document management systems to provide an organizational structure for documents. For example, by assigning attributes to a document, the document management system is able to determine who created a document and who has access to that document.

One aspect of a document management system is retention management. Retention management is commonly used in document management systems to manage expensive on-line storage by automatically purging documents which need not be retained on-line. This deletion process results in significant savings by allowing reuse of the expensive on-line storage space.

One problem that prior art retention management schemes have is the verification of authorization when a document is to be deleted from the data processing system. Retention of a document is usually specified as a time stamp that is one of the attributes of the document. The time stamp contains the expiration time of a document and is specified by an authorized security subject. The security subject can be a user, an administrator, a group of users with certain authorizations or an application. All documents whose expiration time come due are automatically deleted from the on-line storage.

Prior art data processing systems have several methods of determining when an expiration time has occurred. For example, a data processing system can search through the entire data base, culling those documents that have a current time stamp. Alternatively, the documents can be put into a queue in an order corresponding to their time stamps. Whichever method is used, once the data processing system determines that the expiration has occurred, then the document is automatically deleted.

Any security subject with a "modify" level of authorization to the document can modify the attributes and hence can set the retention time stamp. This means that documents can be deleted by unauthorized users or users with only "modify" authorization by setting the retention time stamp equal to the current system time.

One possible solution to this problem is to limit access to the time stamp to those security subjects having "delete" authorization. However, it can be shown that unauthorized removal of a document is still possible. For example, the security subject may have "delete" authorization at the time the retention time stamp is set. Subsequent to this and prior to the retention time stamp, the security subject's "delete" authorization may be revoked. However, the retention management process does not have access to this new information regarding the status of the security subject's authorization and the document is deleted from the system. Therefore, a better solution is needed.

SUMMARY OF THE INVENTION

It is an object of the present invention to provide a method and system for dynamically verifying authorization in a retention management scheme.

The method of the present invention deletes an object in a data processing system. The object is provided with an expiration time by a security subject. The method determines when the expiration time has occurred. When the expiration time has occurred, then it is determined if the security subject has the authority to delete the object. If the security subject has authority to delete, then the object is deleted. Otherwise, the object maintained on the data processing system.

The data processing system in the present invention deletes therefrom an object having an expiration time provided by a security subject. The data processing system includes means for determining when the expiration time has occurred. There is also means for determining if said security subject has the authority to delete said object. The means for determining if the security subject has the authority to delete the object is responsive to the means for determining if the expiration time has occurred. There is also means for deleting the object, which means for deleting is responsive to the means for determining if the security subject has authority to delete the object.

In order to provide or modify an expiration time of an object, the security subject must have appropriate authorization, otherwise the data processing system will ignore any attempts by the security subject to modify the expiration time attribute of the object. With the present invention, the delete authorization of the security subject providing the expiration time of the object is also determined at the time the object is to be deleted. Thus, if the delete authorization of the security subject changes between the times when the security subject provided the expiration time attribute of the object and the actual occurrence of the expiration time, then this change is detected and deletion of the object is denied. By dynamically verifying authorization of expiration times, the present invention protects against premature deletions of objects in a data processing system.

BRIEF DESCRIPTION OF THE DRAWINGS

FIGS. 2–4B are flow charts showing the method of the present invention. FIG. 2 shows a method for dynamically verifying authorization of a security subject who provides the expiration time of an object. FIGS. 4A and 4B show the method for deleting a folder.

FIGS. 5–9 illustrate successive times in an example of the retention management scheme.

DESCRIPTION OF PREFERRED EMBODIMENT

Figure 1:
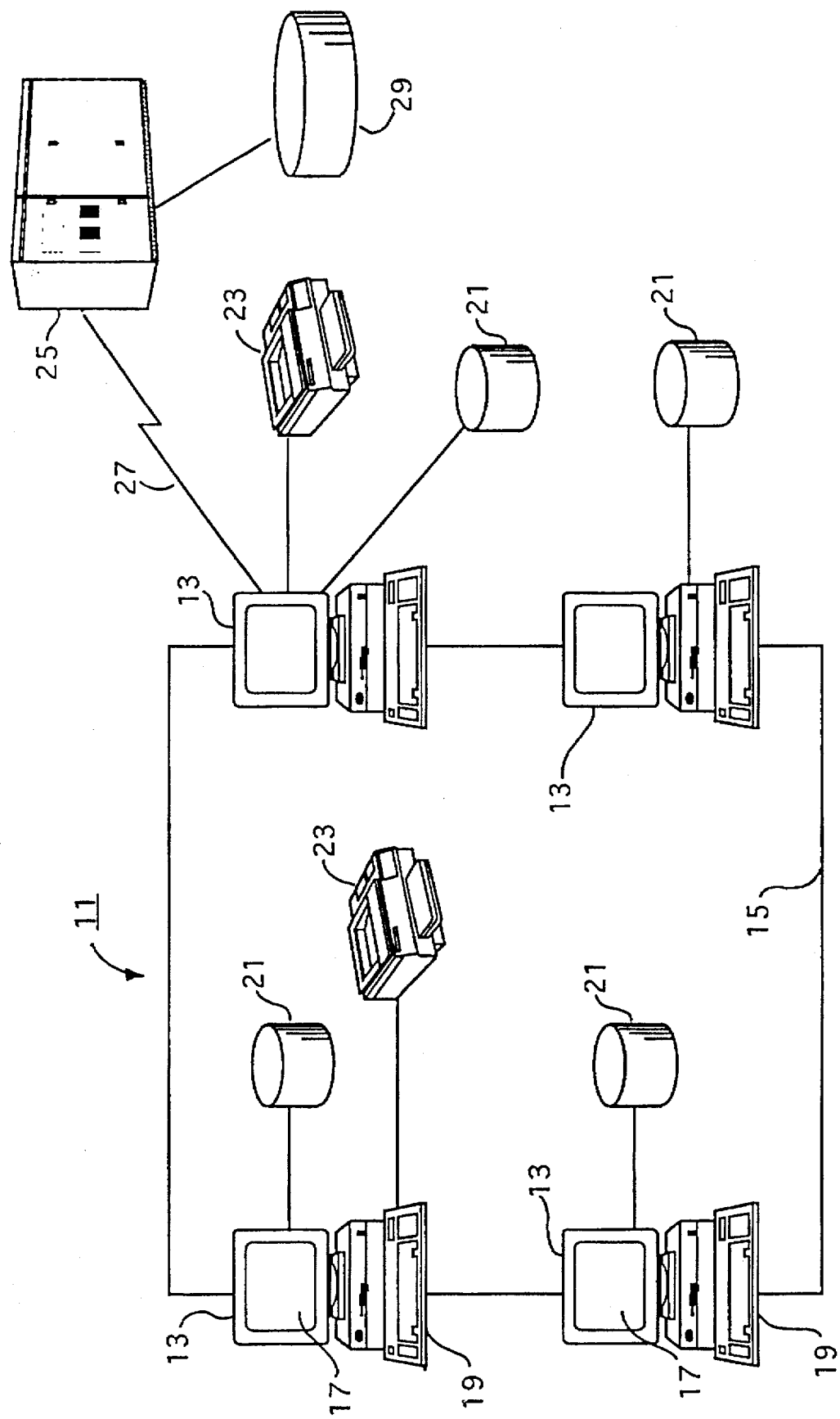
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe computer 25 that is coupled to one of the computers by a communication link 27. The mainframe computer 25 may also be coupled to a storage device 29 which may serve as a remote storage for the computers.

The data processing system 11 contains plural objects, such as documents and folders. These objects are stored on the storage devices 21, 29. The present invention provides a retention management scheme for automatically deleting objects from the storage devices at predetermined times.

Each object that is to be subjected to retention management in the document management system is associated with a pair of attributes for retention management. The specification of this pair of attributes is:

<retention time stamp, security subject ID>.

The retention time stamp is the expiration time of the object. Upon the occurrence of the specified time stamp, the object becomes eligible for deletion. The retention time stamp can be a specific day, time of day, month, year, etc. The type of retention time stamp is specific to the particular data processing system.

The security subject ID is the name of the security subject providing the retention time stamp. The retention time stamp may be specified when the object is created. The time stamp may be subsequently modified by a security subject with the appropriate authorization level. The appropriate authorization level is "modify" or "delete".

At the time the object, such as a document or folder, becomes eligible for deletion (due to the occurrence of its expiration time or retention time stamp), the dynamic authorization verification method determines if the security subject who provided the expiration time is still authorized to delete the object. If the security subject is not authorized to delete the object, then an error is returned and the object is maintained on the data processing system. Therefore, the expiration time is ignored because it is unauthorized. If the security subject has authority to delete at the expiration time, then the object is deleted from the data processing system.

The method of the present invention will now be described with reference to the flow chart of FIGS. 2–4B. In the flow charts, the following graphical conventions are observed: a rectangle for either a process, function or screen display, a subrectangle or diamond for a decision and a circle for a connector in exiting to or entering from another part of the flow chart. These conventions are well understood by programmers skilled in the art and the flow charts are sufficient to enable a programmer skilled in the art to write code in any suitable computer programming language, such as BASIC, PASCAL or C for a computer such as the IBM Personal System / 2(PS/2) family of computers which supports these languages.

Figure 2:
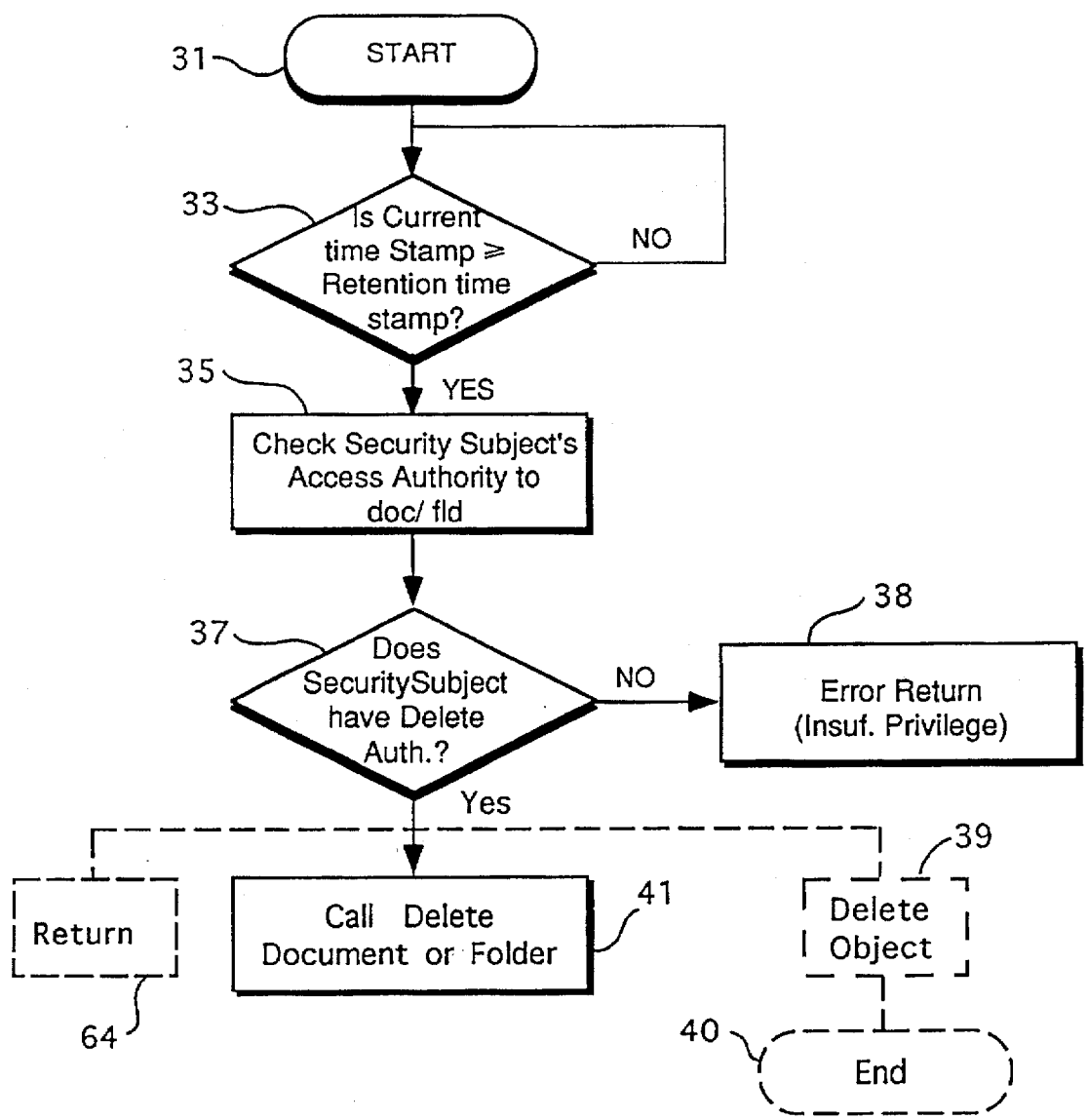

Referring to FIG. 2, the dynamic authorization verification method will be explained. The method is started and initialized, step 31. In step 33, the method determines if a particular object is eligible for deletion. This is accomplished by determining if the current time of the data processing system 11 is greater than or equals the time specified by the retention time stamp listed as an attribute. Each object can be presented for processing in step 33 by several methods. One such method involves the use of polling. Each object is periodically polled and the retention time stamp is compared to the current system time in step 33. If the result of step 33 is NO, then the dynamic authorization verification method loops back to repeat step 33 with another object. Alternatively, a document or folder can be selected for processing by the method of FIG. 2 using interrupts. Upon the occurrence of the specified time stamp, an interrupt is created to invoke the method of FIG. 2.

If the result of step 33 is YES, the object is eligible for deletion, then the method checks the access authorization of the security subject who is identified in the retention attributes, step 35. In step 37, the method determines if the security subject has delete authorization. If the result of step 37 is NO, then the method proceeds to step 38 where an error is returned because of insufficient delete privileges. The method can provide notification of this error to either a log file, the security subject who attempted the deletion or to a security subject with proper delete authority designated as a recipient for such an error. If the result of step 37 is YES, then the method deletes the object.

If the object to be deleted is a document that is not located within a hierarchically structured system, then a simple delete object step 39 will accomplish the task. After deleting the object, the method ends, step 40.

However, if the object to be deleted is a document or folder that is located within a hierarchically structured system, then related portions of the hierarchy must be considered before deletion is carried out. The method proceeds from step 37 to step 41, wherein a routine for deleting the document or folder is called. The delete methods of FIGS. 3A–4B accomplish this task. The delete document or folder method of FIGS. 3A and 3B processes a document or folder for deletion. This method determines if a document or folder is eligible for deletion, and if so, deletes the document or folder. First, the method determines if the object being processed for deletion is a document or a folder. If the object is a document, then there are no hierarchical relations to be considered and the document is deleted upon the occurrence of the retention time stamp. If the object is a folder, then all of its descendants must be examined before the folder can be deleted. If all of the descendants are eligible for deletion, then they and the folder are deleted. If only some of the descendants are eligible for deletion, then they are deleted, but the folder and the ineligible descendants are maintained on the data processing system. The folder is not deleted until all of its descendants are eligible for deletion. Eligibility for deletion is determined by whether a descendant item is unlocked, whether the retention security subject has delete authorization, if the item's retention time stamp has occurred and if the item itself has any descendants that are all eligible for deletion. If the item itself does have descendants (meaning that the item is a folder), then the delete folder method of FIGS. 4A and 4B is invoked. This method processes the folder and its descendant items for deletion in the same way as the method of FIGS. 3A and 3B.

Figure 3A:
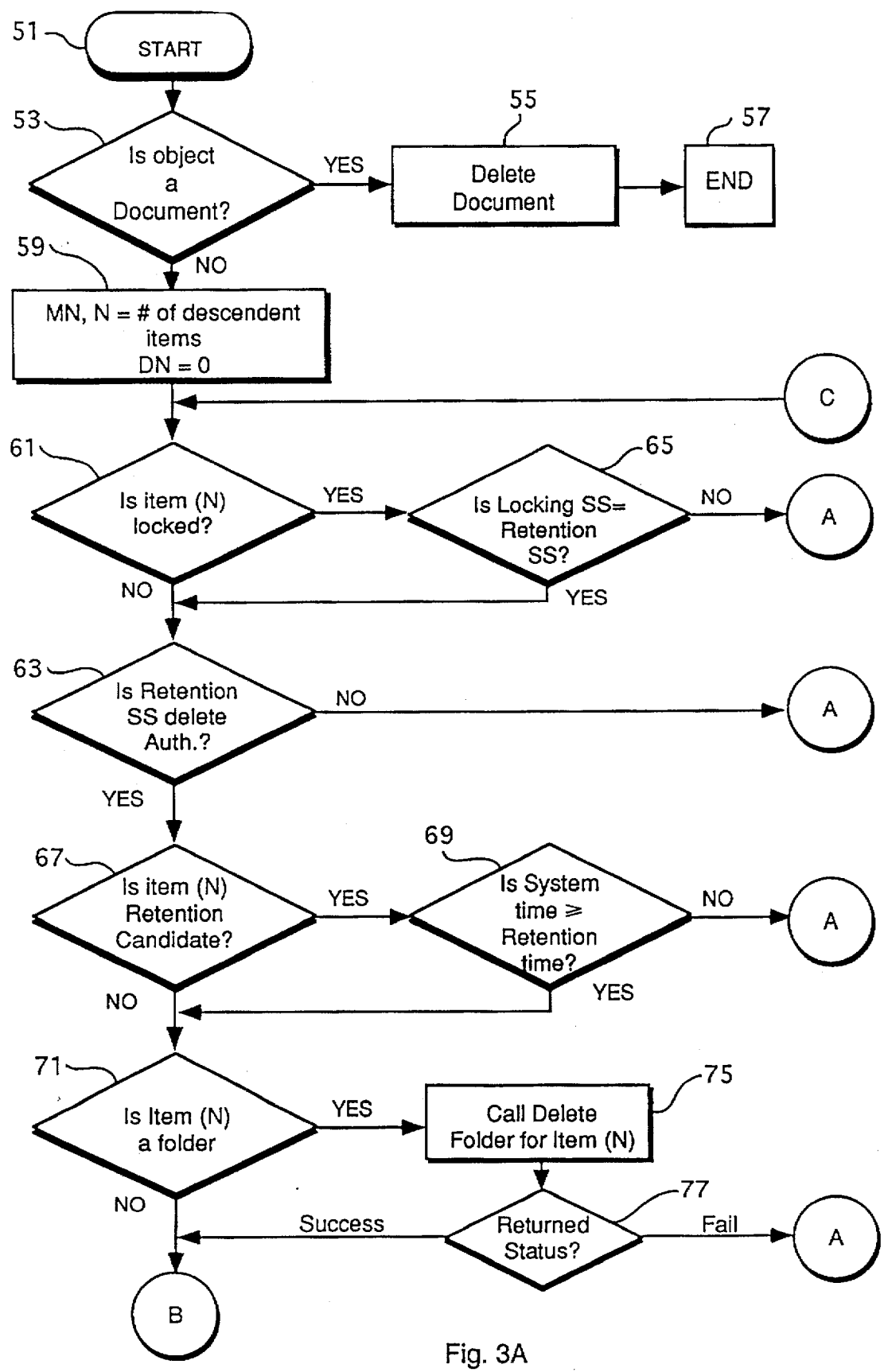
FIGS. 3A and 3B show the method for deleting a document or folder.
Figure 3B:
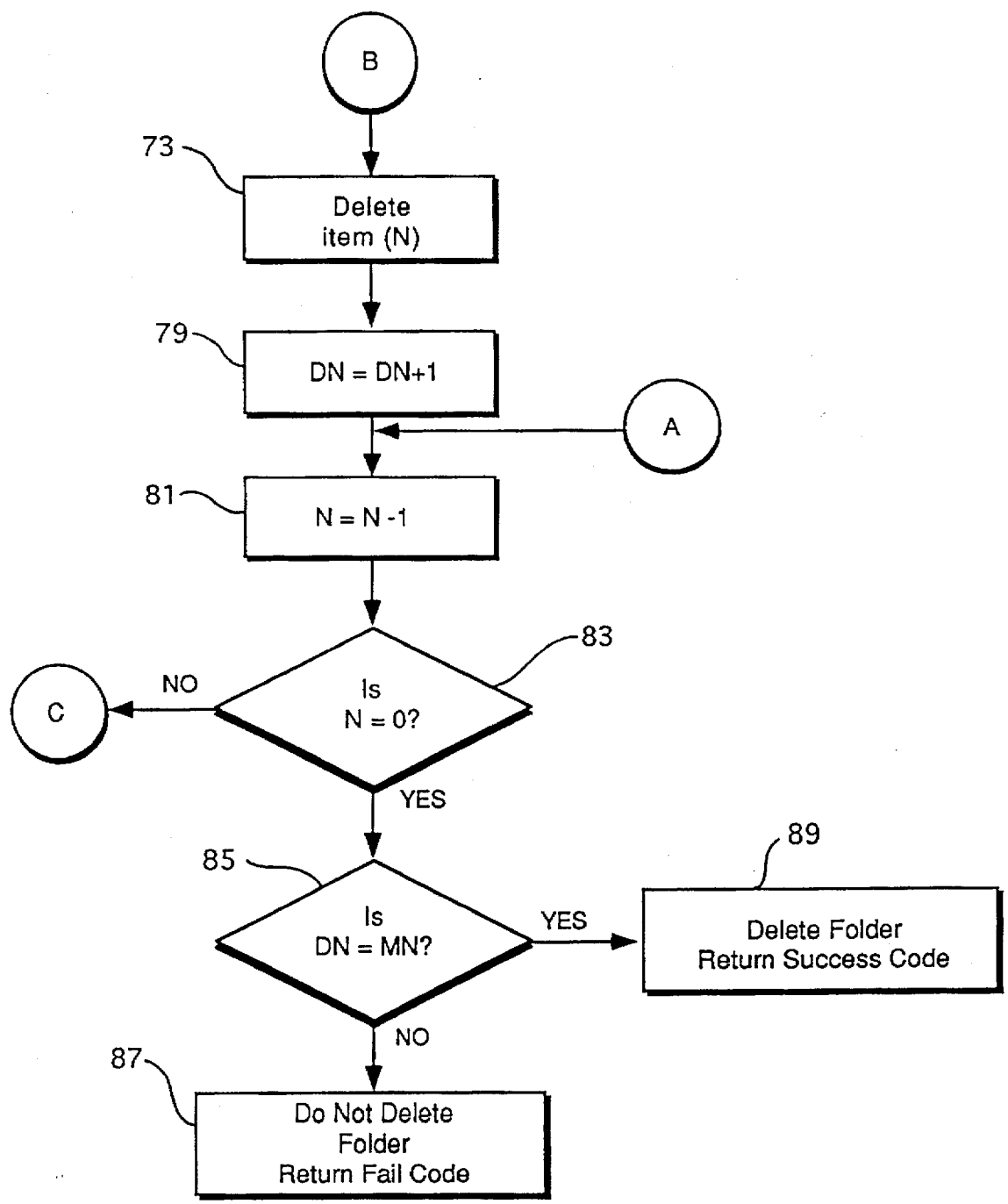
Figure 4A:
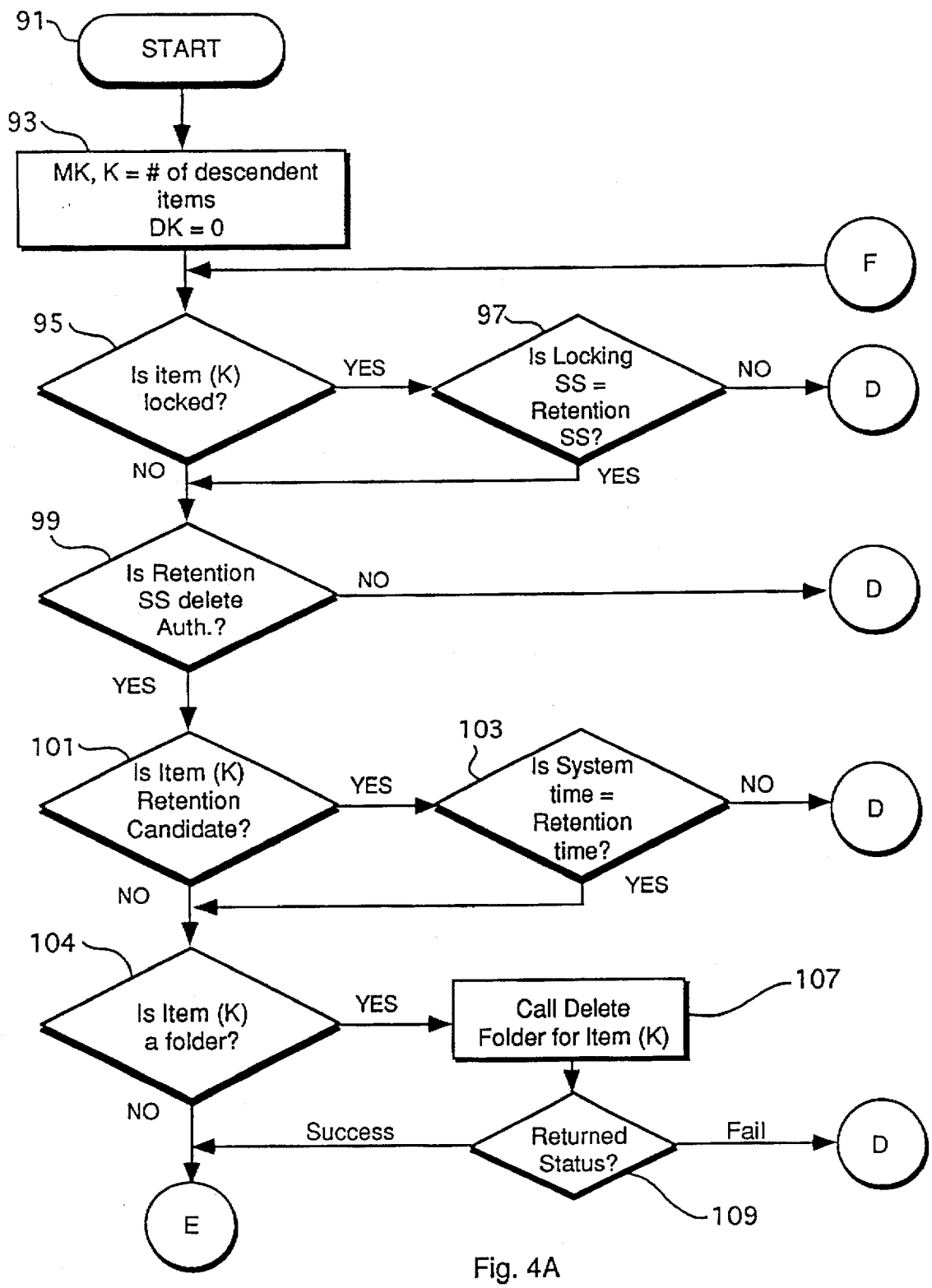
Figure 4B:
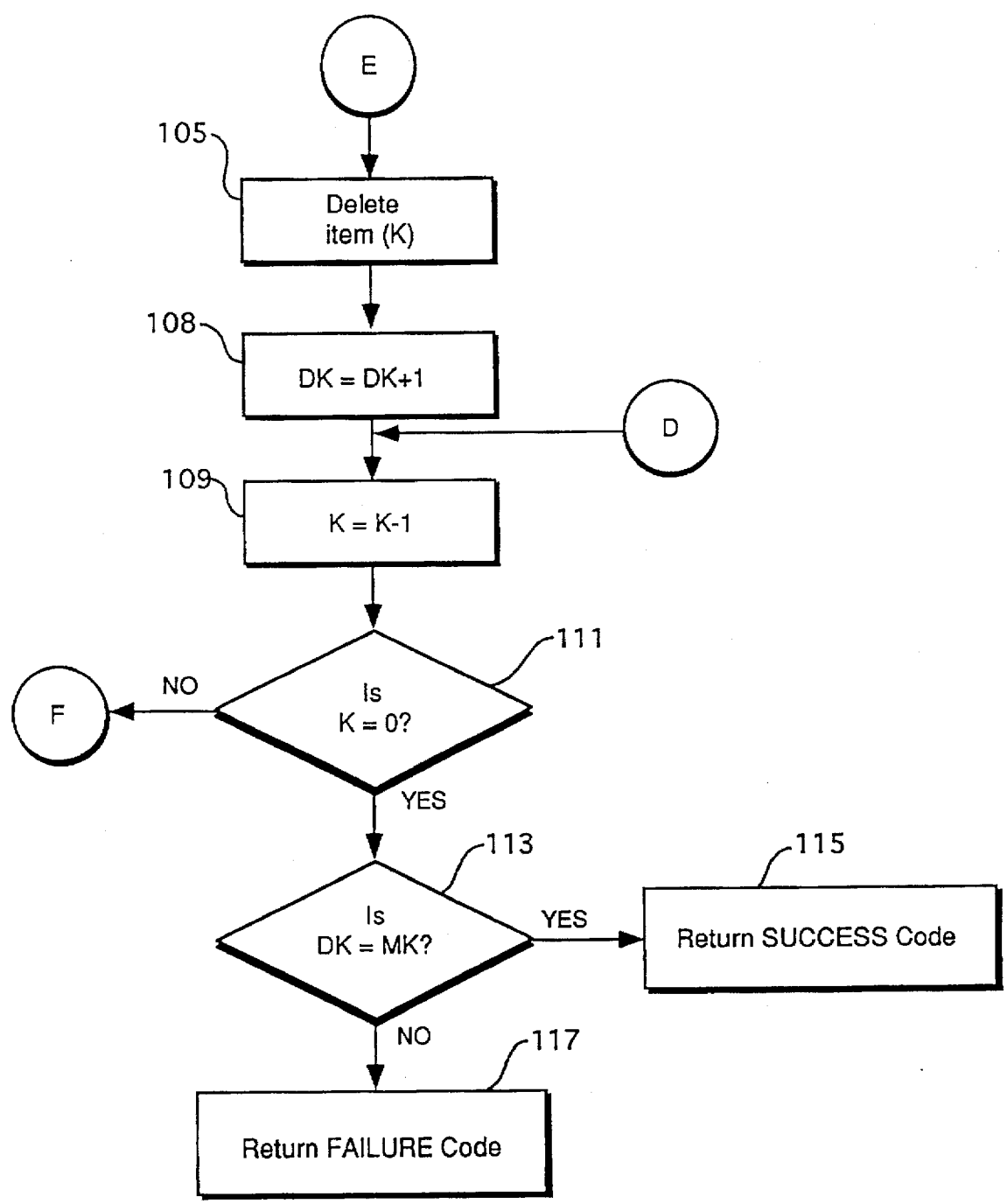

Referring to FIGS. 3A and 3B, the method of deleting a document or folder will now be described. The method can be invoked, step 51, in several ways. In the preferred embodiment, the method is invoked by step 41 of the authorization method of FIG. 2. Alternatively, the method can be invoked whenever a document or folder is to be deleted such as immediately after a YES determination in step 33 of FIG. 2.

In step 53, the method determines if the object to be deleted is a document. If YES, the object is a document, then the document is deleted, step 55 and the method ends, step 57.

However, if the result of step 53 is NO, then the object is a folder and the method proceeds to step 59. Before the folder can be deleted, the method determines if the contents of the folder are eligible for deletion. This prevents premature deletion of some or all of the contents of the folder. In step 59, several indices are set to predetermined values. The indices are MN, N and DN. MN and N are set equal to the number of descendant objects in the folder, which is to be deleted. Such descendant objects are subfolders and documents. To avoid confusion between the object which is to be deleted and its descendant objects, the descendant objects will be referred to herein as items. The indices MN and N are set equal to the number of descendant items in the folder. The index DN is set to zero.

Beginning with step 61, the method examines each descendant item (beginning with item (N) and counting downward to item (0)) to determine if that descendant item qualifies for deletion. In step 61, the method determines if item (N) is locked. An item is locked if it has been borrowed by another security subject. Locking prevents the modification of an item by the data processing system or another security subject while the borrowing security subject is working on that object. If the result of step 61 is NO, item (N) is not locked, then the method proceeds to step 63. If the result of step 61 is YES, then the method proceeds to step 65, where it determines if the security subject who is locked item (N) is also the security subject who has set the retention time stamp. If the result of step 65 is YES, then the lock on item (N) is overridden and the method proceeds to step 63.

In step 63, the method determines if the security subject that set the time stamp for deletion of item (N) is authorized to delete. Thus, just as the dynamic authorization method of FIG. 2 was applied to the object (which is a folder) to determine if the security subject specifying the object's time stamp had proper delete authority, the same dynamic authorization verification method is applied to a descendant of that object, item (N). Verification of the security subject's delete authorization for item (N) is accomplished by invoking the method of FIG. 2. When the method of FIG. 2 is invoked by step 63, its last step 64 is a return step, in order to return to step 63. Thus, when called by step 63, if the result of step 37 in FIG. 2 is YES, the method proceeds to step 64 and returns to step 63. If the result of step 63 is YES, the retention security subject is delete authorized, then the method proceeds to step 67. In step 67, the method determines if item (N) is a retention candidate by virtue of item (N) having a retention time stamp. If the result of step 67 is NO, item (N) is not a retention candidate, then the method proceeds to step 71. If the result of step 67 is YES, item (N) does have a retention time stamp, then in step 69, the method determines if the retention time stamp has occurred. If the current system time is greater than or equal to the retention time, then the result of step 69 is YES, item (N) is a candidate for deletion. The method then proceeds to step 71.

In step 71, the method determines if item (N) is a folder. If NO, item (N) is not a folder but is a document, then the method proceeds to step 73. If the result of step 71 is YES, item (N) is a folder, then in step 75, the method calls the delete folder method (shown in FIGS. 4A and 4B). As will be explained in more detail hereinafter, the delete folder method of FIGS. 4A and 4B processes item (N), which is a folder, to determine if all of the descendant items in item (N) are eligible for processing. Upon the completion of the delete folder method, a status of either SUCCESS or FAIL is returned. If a status of SUCCESS is returned, item (N) is eligible for deletion and the method proceeds to step 73.

In step 73, item (N) is deleted. This is because the previous steps have determined that item (N) should be deleted because its expiration time has occurred, the security subject specifying the expiration time has current delete authorization and the item is not locked.

After deleting item (N), some of the indices are changed. DN is incremented by 1, step 79 and N is decremented by 1, step 81. In step 83, the method determines if N=0. If NO, then the method loops back to steps 61 et seq. to determine if the next item (item (N−1)) is eligible for deletion, and if so, then to delete it. In this manner, all N items of the object are processed to determine if they are to be deleted.

Step 79 is bypassed, wherein DN is not incremented, if item (N) is locked by a security subject who is not the retention security subject (a NO result from step 65), if the security subject who set the retention time stamp has no current delete authorization (a NO result from step 63), if the retention time or expiration time has not yet occurred (a NO result from step 69), or if the delete folder method returns a FAIL status, step 77. The failure to increment DN even once is detected by step 85. The method proceeds to step 85 when the result of step 83 is YES. In step 85, the method determines if DN =MN. MN was set to the number of descendant items back in step 59. The failure to increment DN even once, due to step 79 being bypassed, indicates that the folder object has at least one descendant item that is not ready for deletion, because either that descendant item is locked, the retention security subject of that item is not properly authorized or the item's retention time has not yet occurred. Thus, the folder object cannot be deleted and a NO result is produced by step 85. The method proceeds to step 87, wherein the folder object is not deleted and a FAIL code is returned. If DN=MN, a YES is produced by step 85 and the method proceeds to step 89. In step 89, the folder object is deleted and a SUCCESS code is returned. The codes SUCCESS, FAIL can be displayed to the system administrator or to one of the security subjects having delete authority.

Referring now to FIGS. 4A and 4B, the delete folder method will now be described. The delete folder method is called by step 75 in FIGS. 3A, 3B for item (N), wherein the method is started, step 91. In step 93, several indices are set to predetermined values. MK and K are set equal to the number of descendant items in item (N). Furthermore, DK=0. In step 95, the method determines if item (K) is locked and if YES, then determines if the locking security subject is the same as the retention security subject, step 97. If the result of step 95 is NO, or if the result of step 97 is YES, the method proceeds to step 99, wherein the delete authorization of the retention security subject is verified. The method of FIG. 2 is invoked, just as it was with step 63 in FIG. 3A. After the method of FIG. 2 verifies the delete authority, it returns via step 64 to step 99. If the result of step 99 is YES, then the method determines if item (K) is a retention candidate, step 101. If the result of step 101 is YES, then the method determines if the retention time has occurred, step 103. If the result of step 103 is YES, or the result of step 101 is NO, then the method proceeds to step 104. The method determines if item (K) is a folder. If NO, item (K) is not a folder, it is instead a document, then item (K) is deleted, step 105. If the result of step 104 is YES, item (K) is a folder, then the delete folder method of FIGS. 4A, 4B is called, step 107, wherein folder item (K) is processed to determine the eligibility of the folder for deletion. The result of step 107 is to return a status of either SUCCESS or FAIL, which is determined in step 109. If the result of step 109 is SUCCESS, that is folder item (K) has had all of its descendant items deleted, then the method proceeds to step 105, wherein the folder item (K) itself is deleted. In step 108, DK is incremented by 1, and in step 109, K is decremented by 1. In step 111, the method determines if K=0. If NO, the method loops back to step 95. If YES, the method proceeds to step 113, where it determines if DK=MK. The result of step 113 is YES if step 108 is performed for every descendant item of item (N). Thus, the method proceeds to step 115 wherein SUCCESS is returned. If DK has not been incremented in step 108 for every descendant item of item (N), then the result of step 113 is NO. The method then returns FAIL, step 117. Step 108 is bypassed if any item (K) is locked (a NO result from step 97), if the retention security subject is not delete authorized (a NO result from step 99), if the retention time has not yet occurred (a NO result from step 103), or if the return status from calling the delete folder method is FAIL in step 109.

Referring now to FIGS. 5–9, an example will be discussed. In the example, folder A contains the following items: folder B, folder C, folder D, and document 1. Folder B has descendant documents 2 and 3, folder C has descendant documents 4 and 5 and folder D has descendant documents 6 and 7. The security subjects are X and Y. Security subject X has delete authority throughout the duration of the example, while security subject Y has modified authority throughout the example. The objects have the following retention attributes in the form of <retention time stamp, security subject ID>: Folder A<100, X>; Folder B<110, X>; Folder C<100, X>; and document 1<90, X>. Folder D has no retention attributes, but does have a lock status <locked, Y>. The retention time stamp is given in abstract units such as 100, 110. These units could signify, for example, 100 time units from when the system clock began keeping time.

At system time=80, FIG. 5, the dynamic authorization verification method of FIG. 2 determines if any retention time stamp has occurred, step 33. As the result of step 33 is NO, the method merely loops at step 33. Therefore, no deletions are made.

This looping continues until the system time=90, FIG. 6, wherein the result of step 33 is YES for document 1. This is because the retention time stamp of 90 is equal to the current time system of 90. In steps 35 and 37, the method checks if security subject X has delete authority. Finding this to be YES, the delete document or folder method of FIGS. 3A and 3B is called, step 41. Referring to FIGS. 3A and 3B, it is determined that document 1 is a document and not a folder, step 53. Thus, document 1 is deleted, step 55. No further deletions are made.

At system time=100 (FIG. 7), the method of FIG. 2 determines that Folder C has a retention time stamp that is equal to current system time, step 33 and that X has delete authority, step 37. The result of step 37 is YES, wherein the method of FIGS. 3A and 3B is called. The method passes through step 53 to step 59 because the folder C is a folder and not a document. In step 59, MN and N are set to 2, because documents 4 and 5 are the only descendant items, and DN=0. The method examines item (2), which is document 5, to determine if it is locked (a NO from step 61), if security subject X has delete authorization (a YES result from step 63), if document 5 is a retention candidate (a NO result from step 67 because no retention time stamp specific to document 5 has been provided), and if document 5 is a folder (a NO result from step 71), wherein document 5 is deleted, step 73. In step 79, DN is set to 1 and in step 81, N=1. In step 83, the result is NO, and the method loops back to step 61, where the same determinations are made for document 4. The result is the deletion of document 4 in step 73 because no retention attributes have been provided for document 4. In step 79, DN is incremented to 2 and in step 81, N=0. In step 83, the result is YES, wherein DN is compared to MN, step 85. Both equal 2 because all of the descendant items (documents 4 and 5) of Folder C have been deleted. Therefore, the method proceeds to step 89, wherein Folder C is deleted and a SUCCESS code is returned.

Still at system time=100, folder A is also found to have a current time stamp by the method of FIG. 2. The method of FIG. 3A proceeds through steps 53, 59, to step 61. MN and N=2 (or 3 if Folder C is processed for deletion after Folder A is processed for deletion). In steps 61 et seq., Folder D, being a descendant of Folder A, is processed for deletion as item (2). The method proceeds to steps 61 and 65, wherein it is determined that Folder D is locked by security subject Y. Thus, the method proceeds from step 65 directly to step 81. DN is not incremented. N is decremented to 1, step 81 and step 83 causes the method to loop back to step 61. Folder B is processed, wherein it is determined, in steps 67 and 69 that the retention time stamp has not yet occurred. Thus, Folder B is maintained and not deleted. The method then passes through steps 81 and 83 to step 85, where it is determined that DN (which is 0) does not equal MN (which is 2). Thus, in step 87, Folder A is not deleted.

At system time=105 (see FIG. 8), security subject Y unlocks Folder D. Folder A is again processed for deletion by the method of FIGS. 3A and 3B. Folder D, as item (2) is processed through steps 61, 63, 67, 71 to step 75, wherein the delete folder method is called with respect to Folder D. Referring to FIGS. 4A and 4B, in step 93, MK and K=2 and DK=0. Document 7 is processed first, wherein the method passes through steps 95, 99, 101 and 104 to step 105 because no retention attributes have been provided to document 7. In step 105, document 7 is deleted. DK is set to 1, step 108 and K is set to 1, step 109. The method then loops, through step 111, back to step 95 to process document 6. Document 6 is also deleted in step 105, because, like document 7, it has no retention attributes. The method then sets DK=2, step 108 and K=0, step 109. The method then passes through step 111 to step 113, wherein it is found that both DK and MK are 2. A SUCCESS code is returned, step 115. This is detected in step 77 of FIGS. 3A and 3B, wherein Folder D is itself deleted, step 73. The method of FIGS. 3A and 3B continue on to process Folder B for deletion. Folder B is not eligible for deletion. Therefore, deletion of Folder A is precluded.

At system time=110 (FIG. 9), Folder A is again processed for deletion. At this time, documents 2 and 3 are deleted, as is Folder B because Folder B's retention time stamp has occurred. Therefore, in step 89, Folder A is deleted.

The foregoing disclosure and the showings made in the drawings are merely illustrative of the principles of this invention and are not to be interpreted in a limiting sense.

We claim:

1. A method of deleting an object in a data processing system, said object being provided with an expiration time by a security subject, comprising the steps of:

a) determining when said expiration time has occurred;

b) when said expiration time has occurred, determining if said security subject has authority to delete said object; and c) deleting said object if said security subject has authority to delete, otherwise maintaining said object on said data processing system.

2. The method of claim 1 wherein said step of determining when said expiration time has occurred further comprises the step of comparing said expiration date to a current time of said data processing system.

3. A data processing system having an object located thereon, said object having an expiration time provided by a security subject, comprising:

a) means for determining when said expiration time has occurred;

b) means for determining if said security subject has the authority to delete said object, said means for determining if said security subject has the authority to delete said object being responsive to said means for determining when said expiration time has occurred; and c) means for deleting said object if said security subject has authority to delete and for otherwise maintaining said object on said data processing system.

4. The data processing system of claim 3 wherein said means for determining when said expiration time has occurred further comprises means for comparing said expiration date to a current time of said data processing system.

* * * * *